M. R. KENDALL.
AEROPLANE CLUTCH.
APPLICATION FILED MAY 25, 1912.
1,059,372.
Patented Apr. 22, 1913.
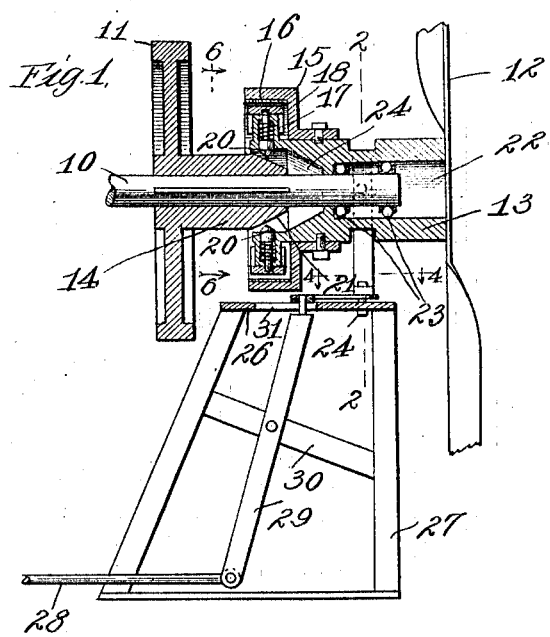
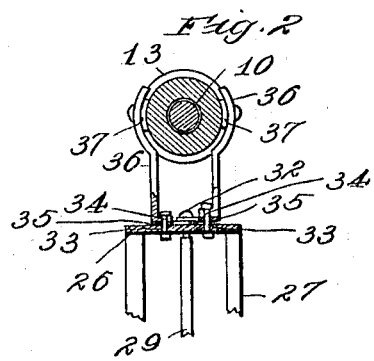
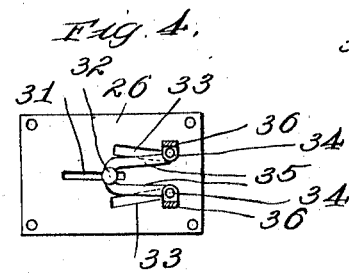
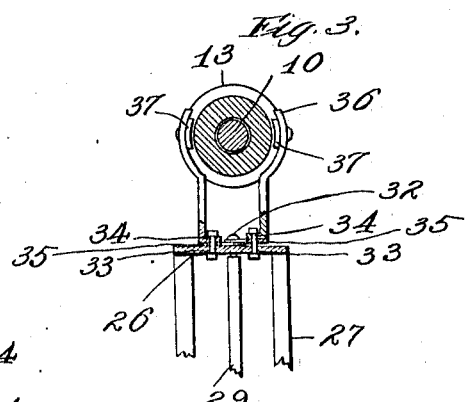
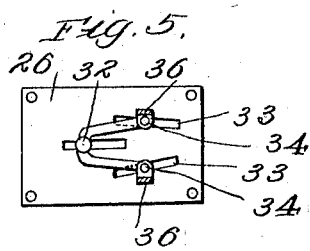
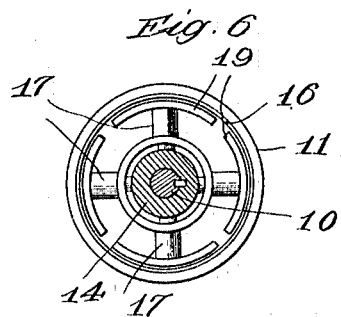
WITNESSES
INVENTOR
M. R. Kendall
by
Attorney.

UNITED STATES PATENT OFFICE.

MARVIN R. KENDALL, OF ITHACA, NEW YORK.

AEROPLANE-CLUTCH.

1,059,372.

Specification of Letters Patent.

Patented Apr. 22, 1913.

Application filed May 25, 1912. Serial No. 699,812.

*To all whom it may concern:*

Be it known that I, MARVIN R. KENDALL, a citizen of the United States, and residing at 814 North Cayuga street, Ithaca, in the county of Tompkins and State of New York, have invented certain new and useful Improvements in Aeroplane-Clutches, of which the following is a specification.

This invention relates to improvements in aeroplane clutches and is designed as a clutch and an actuating means therefor, whereby the aeroplane propeller may be started and stopped at will at any time during the operating of the machine.

While the primary object of the invention is to provide such a controlling device for use with aeroplanes, it should nevertheless be understood that the present improvements are claimed for use with other than aeroplane motors and in combination with any motor to which the same is applicable.

Specifically, the object of the invention is to provide in combination with a motor clutch a means whereby an actuation of the clutch to an inoperative position, results in applying a friction brake to the then unclutched propelling member, such as the propeller and conversely, operating upon a setting of the power clutch to release said brake device from the propeller.

With these objects in view and others that will appear as the nature of the invention is better understood, the same consists of the novel combination and arrangement of parts hereinafter fully set forth, illustrated in the accompanying drawings and pointed out in the appended claims.

In the drawings forming part of this application and in which like numerals of reference correspond to similar parts throughout the several views: Figure 1 is a vertical longitudinal sectional view of the device, Fig. 2 is a vertical transverse sectional view taken upon line 2—2 of Fig. 1, with the braking device in the operative position, Fig. 3 is a similar view illustrating the brake members released, Fig. 4 is a top plan view of the base plate showing the elements as positioned as in Fig. 2, Fig. 5 is a plan view of said plate with the elements positioned as shown in Fig. 3, and Fig. 6 is a vertical transverse sectional view taken upon line 6—6 of Fig. 1.

Referring more in detail to the drawings, it will be noted that the power shaft 10 of the motor, not shown, is provided with a fly wheel 11, while said motor is adapted for operating the propelling blades 12, the latter constituting the aeroplane propeller.

A general clutch mechanism for engaging and disengaging the hub 13 of the propeller with the hub 14 of the fly wheel and power shaft is shown in detail in Fig. 1. This mechanism consists, as will be readily understood, of an annular bracket 15 rigidly secured in any desired manner to the propeller hub 13 and having its inner annular surface covered with leather as indicated as 16. Radial tubular bearings 17 either integrally or otherwise mounted adjacent the inner end of the propeller hub 13 journaled therein the rods 18 each of which is supplied with a segment shaped contact plate 19 adapted to be forced against the leather lining 16 by an engagemnt of the heads 20 upon the inner ends of said rods with the conical surface 21 forming the inner end of the fly wheel hub 14.

The propeller hub 13 is preferably provided with an inner chamber 22 for receiving the outer end of the propeller shaft 10, as well as positioning the same upon anti-friction ball members 23, while a longitudinal movement of the propeller hub is made possible by the conical chamber 24 in the inner end of the propeller hub.

An annular groove 25 around the propeller hub provides for the loose engagement therewith of a means or actuator whereby the propeller blade hub and the clutch carried by the latter may be readily shifted longitudinally and so as to clutch up the propeller hub with the fly wheel hub upon a movement inwardly exerted upon said propeller hub. A reverse movement of the propeller hub in an outward direction effects a releasing of said clutch and a consequent disengagement of the propeller hub from the fly wheel hub.

The invention proper and comprising a combined clutch actuator and brake will now be described, the same being one that may readily be employed in connection with any motor and its driven or propelled rotor.

Suitably positioned with respect to the propeller or driven hub is the actuating base plate 26 here shown as mounted upon suitable standards 27, while the rod 28 adapted for manipulation in controlling the clutch, has a connecting link 29 pivoted to the brace strut 30 of the frame. Said base plate 26 has extending through a longitudinal slot 31 therein, a headed pivot pin 32 which is rigidly mounted upon the upper end of said link 29. Outwardly converging slots 33 being provided through the plate 26 slightly in advance and upon either side of the slot 31, accommodate roller bearing pins or bolts 34 extending through the outer ends of each of two actuating movable links 35, the other ends of each of said links being pivoted to the single pin 32. Positioned upon opposite sides and within the annular groove 25 are the curved arms 36 having inner bearing faces 37 and adapted to clasp the adjacent reduced portion of the propeller hub upon a proper actuation of said arms imparted thereto by the links 35 and to which said arms are linked by the bolts 34 heretofore described.

Assuming the propeller in clutch with the motor, an inward pull exerted upon the clutch rod 28 operates through the mechanism described to force the propeller hub 13 outwardly, thus releasing its clutch from the fly wheel hub 14, while simultaneously therewith, the arms 36 are forced inwardly upon the propeller shaft and by their frictional contact therewith retard the velocity of its rotation due to the momentum of the blades. The arms 36 then assuming the position shown in Fig. 2, it is evident that an outward push exerted upon the clutch rod 28 will force the links 35 inwardly causing a similar movement to said arms which is also accompanied by a separation thereof due to the action of the slots 33 and thus resulting in a releasing of the arms 36 from the propeller hub and a clutching up of the same with the fly wheel hub 14. It will thus be apparent that a stopping and starting of the propeller from the seat of the aeroplane is readily accomplished without requiring any cessation in the running of the motor.

While the forms of the invention herein shown and described are what are believed to be preferable embodiments thereof, it is nevertheless to be understood that minor changes may be made in the matter of form, proportion and minor details of construction without departing from the spirit and scope of the invention as set forth in the appended claims.

Having thus fully described my invention and in what manner the same is designed for use, what I desire to protect and secure by Letters Patent of the United States is:—

1. A device of the class described, comprising a wheel hub, a base plate having converging slots and a longitudinal slot therein, roller pins within said converging slots, opposite arms pivoted upon said pins and adapted for movement into and out of engagement with said wheel hub, a pin projecting through said longitudinal slot, links connecting said pin and said roller pins, and means for moving said pin lengthwise of said longitudinal slot.

2. A device of the class described comprising a driving member, a driven member, clutch members positioned therebetween, a base plate having converging slots and a longitudinal slot therein, roller pins within said converging slots, oppositely-positioned arms pivoted upon said pins adapted for actuating said clutch members, said arms movable into frictional engagement with said driven member, a pin projecting through said longitudinal slot, links connecting said pin and said roller pins, and means for moving said pin lengthwise of said longitudinal slot.

In testimony whereof I affix my signature in presence of two witnesses.

MARVIN R. KENDALL.

Witnesses:
 MORRIS S. HALLIDAY,
 HARRY C. BALDWIN.

Copies of this patent may be obtained for five cents each, by addressing the "Commissioner of Patents, Washington, D. C."